United States Patent [19]

Box

[11] Patent Number: 4,825,046

[45] Date of Patent: Apr. 25, 1989

[54] THERMAL INTERFACE DEVICE FOR HEATING ELEMENTS

[76] Inventor: David W. Box, 7045 Pebble Way, Colorado Springs, Colo. 80919

[21] Appl. No.: 152,863

[22] Filed: Feb. 5, 1988

[51] Int. Cl.⁴ .............................................. H05B 3/72
[52] U.S. Cl. .................................. 219/433; 219/283; 126/221
[58] Field of Search ............... 219/433, 283; 126/400, 126/221, 214 D, 215, 220, 214 C

[56] References Cited

U.S. PATENT DOCUMENTS

| | | | |
|---|---|---|---|
| 469,597 | 2/1892 | Reid | 126/120 |
| 680,494 | 8/1901 | Meyer | 126/221 |
| 928,634 | 7/1909 | Cruickshank | 126/215 |
| 1,109,323 | 9/1914 | Cruickshank | 126/215 |
| 1,392,868 | 10/1921 | Cruickshank | 126/215 |
| 4,158,125 | 6/1979 | Jones | 219/433 |
| 4,170,931 | 10/1979 | Fajans | 219/433 |
| 4,406,942 | 9/1983 | Lo Conti | 219/433 |
| 4,622,946 | 11/1986 | Hurley | 126/214 D |
| 4,715,269 | 12/1987 | Stoner | 219/433 |

Primary Examiner—Teresa J. Walberg
Attorney, Agent, or Firm—Timothy J. Martin; J. Preston Oxenham

[57] ABSTRACT

A thermal interface device is inserted between a heating element and a cooking vessel, such as a coffee pot for an automatic drip coffee maker, to reduce scorching and burning from non-uniform heating. The interface device has a main flat plate dimensioned correspondingly to the heating element and includes raised support structures formed as dome-shaped structures thereon. The cooking vessel rests on and is supported by the top surface of the support structures in spaced relation to the plate thus creating a convection space which reduces thermal conductive heating and allows both convection heating and infrared heating. An adhesive layer may be used to secure the interface device to the heating element, and vent holes either through the flat plate or through the dome-shaped structures vent stream and vapors from underneath the interface device when positioned on the heating element.

18 Claims, 3 Drawing Sheets

THERMAL INTERFACE DEVICE FOR HEATING ELEMENTS

FIELD OF THE INVENTION

The present invention generally relates to an interface device forming a thermal mass that is adapted to be placed on a traditional heating element, such as a hot plate or other electric element, and support thereon a vessel containing food or beverage to be heated by the heating element. The interface device is operative to prevent scorching or burning of the contents of the vessel and thus acts to reduce the heating effects of thermal conduction and increase the heating effects from convection and infrared heating. Specifically, this interface device is directed to implementation with a drip coffee maker in order to prevent scorching of liquid coffee after it has been brewed.

BACKGROUND OF THE INVENTION

The use of electric heating elements, including electric ranges, hot plates, and the like, is pervasive throughout most modern kitchens. In such heating systems, electric current is used for the resistive heating of a wire that may be encased in a helical heating element or otherwise encased in a thermal unit as a flat heat source. One problem attendant with such heating elements, though, are localized heating phenomena or "hot spots" that occur over the support surface of the heating element. Since a cooking vessel placed on the heating element is primarily heated by thermal conduction along the base of the cooking vessel, it is not unusual for the base of the cooking vessel to have corresponding hot spots of greater temperature even though the average temperature over the base is much lower. Food or beverages which are placed in the vessel and which are heated by the heating element may accordingly become scorched or burned by these localized hot spots.

One particular type of apparatus to which the present invention is specifically directed is hot beverage brewing devices of the drip brew type, especially drip brew coffee makers. This industry encompasses both multiple unit commercial coffee makers used, for example, in restaurants and institutional kitchens, and single unit home drip brew coffee makers such as those currently marketed by a wide variety of manufacturers. This industry is of particular interest since there has been a rapid expansion of use of coffee makers in the home, as well as in restaurants, over the last 20 years. These coffee makers have, to a large extent, replaced percolating coffee pots both electric and non-electric.

As is well known, the typical coffee maker includes a housing and boiling unit which receives water and heats the water to a brewing temperature. This water is conveyed and dispensed through a coffee-holding filter assembly wherein the water becomes flavored by the coffee and is downwardly dispensed under gravity into a receiving vessel, preferably in the form of a glass coffee pot. This coffee pot receives and stores the brewed coffee from the coffee maker and traditionally rests on a heating element or hot plate thermostatically controlled by the coffee maker. These hot plates may either be a constant temperature heat source, normally in the range of 220°-250° F. or, in the alternative, are cyclical between an "on" state and an "off" state whereby the coffee remains at a fairly constant temperature. In the cyclical systems, though, the heat source typically has a peak amplitude of maximum temperature in the "on" state that exceeds 250° F. to compensate for those times when the source is inactive.

Due to localized heating of both the steady temperature and the cyclical heating elements, excess temperatures at localized areas are transmitted by thermal conduction to that portion of the beverage adjacent thereto. This transmission of excessive heat causes a cooking action within coffee which degenerates flavorable attributes, such as flavor, aroma, and color. Over a period of time, an increasing portion of the coffee is exposed to the excess temperatures, with this situation only being compounded by the removal of coffee for consumption. Therefore, the stored coffee in the coffee pot becomes increasingly degraded over time.

SUMMARY OF THE INVENTION

It is an object of the present invention to provide a new and useful thermal interface device which may be placed between a heating element and a cooking vessel to provide a thermal mass that more uniformly distributes heat generated by the heating element.

Another object of the present invention is to provide a thermal interface device which decreases the amount of heating due to thermal conduction while increasing the amount of heating derived from convection and infrared radiation.

A further object of the present invention is to provide a thermal interface device for use between hot plate heating elements and coffee pots in drip coffee makers wherein the device is simple and inexpensive in manufacture and easy to use.

Yet another object of the present invention is to provide a thermal interface device which may be used with a wide variety of drip coffee makers having either constant temperature hot plates or cyclical hot plates so as to maintain brewed coffee in a stored state for consumption without degradation.

A still further object of the present invention is to provide a thermal interface device which eliminates the localized effects of excessive heat on heating elements which are used to heat cooking vessels.

The present invention, then, is directed to a thermal interface device adapted to be inserted between a heating element and a vessel to be heated to provide a relatively constant temperature thermal mass. In its broadest form, the present invention comprises a flat plate formed of heat-conductive material sized to overlay and be supported by a heating element such as a hot plate or the like. The flat plate has a bottom surface facing the heating element and an upper surface opposite the bottom surface. Raised surface support means, preferably in the form of a plurality of dome-shaped support structures, are located on the upper surface for supporting a cooking vessel in spaced relation to the upper surface whereby the vessel is heating by secondary convection currents from the flat plate. A layer of adhesive material is preferably provided to cover a bottom surface portion and is operative to adhere the interface device to the selected heating element, and, accordingly, the adhesive material is selected to be able to withstand temperatures of at least 200° F. This adhesive material may conveniently be a glass fiber material preferably formed as double-sided tape.

As noted, a plurality of dome-shaped support structures are located on the upper surface to provide a raised surface support for the vessel to be heated. These dome-shaped support structures may be created by deformed regions of the flat plate for ease of manufacture. This construction creates a concavity corresponding to each dome-shaped support structure with each concavity being formed in the bottom surface. The flat plate may also be provided with a plurality of vent holes to allow passage of steam or other vapors therethrough and these vent holes may be conveniently located centrally of each dome-shaped support structure. Furthermore, each dome-shaped support structure may have a flattened top face which defines a support surface for the vessel, with this support face preferably being located at least 0.050" above the upper surface. The flat plate and raised surface supports are preferably formed of a unitary piece of copper material.

The preferred form of the present invention contemplates the combination of the thermal interface plate described above with an automatic drip coffee maker having a heating element and a coffee pot which receives and stores brewed coffee from the coffee maker and which has a base normally supported by the heating element such that the brewed coffee is maintained at an elevated temperature for consumption. The interface plate is dimensioned similarly to the heating element of the coffee maker with the raised supports having top faces oriented along a geometric surface complimentary to the shape of the base of the coffee pot. The interface plate is constructed so that, where the heating element has an operating temperature in the range of 200° to 250° F., and which normally holds brewed coffee in the vessel at a holding temperature in excess of 170° F., the interface plate and raised support structures are configured so that the holding temperature is reduced to less than or equal to 165° F. and at a temperature suitable for consumption. Wherein the heating element is cyclically operated, the interface plate is operative to dampen the amplitude of the maximum temperature of the "on" state of the heating element sufficiently to avoid burning of the brewed coffee while maintaining the brewed coffee at a sufficiently heated temperature for consumption.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

The present invention is directed to a thermal interface device which is adapted to be inserted between a heating element and a vessel to be heated in order to provide a relatively constant temperature thermal mass. As such, this invention is operative to convert the heating process from such heating element from one primarily dominated by thermal conduction to a heating condition dominated by thermal convection and infrared radiation. This interface device thus reduces burning and scorching effects from localized areas on the heating element and acts as a heat sinc to smooth out, i.e., dampen, the heating curve of a cyclical heating element. Furthermore, the present invention is specifically directed to such a thermal interface device used in combination with an automatic drip coffee maker to eliminate localized scorching and burning of brewed coffee caused by the warming element thereof. Accordingly, while the preferred embodiment of the present invention is described with respect to a coffee maker, it should nonetheless be appreciated that the inventive device contained herein may be used with heating appliances in addition to coffee makers.

Figure 1:
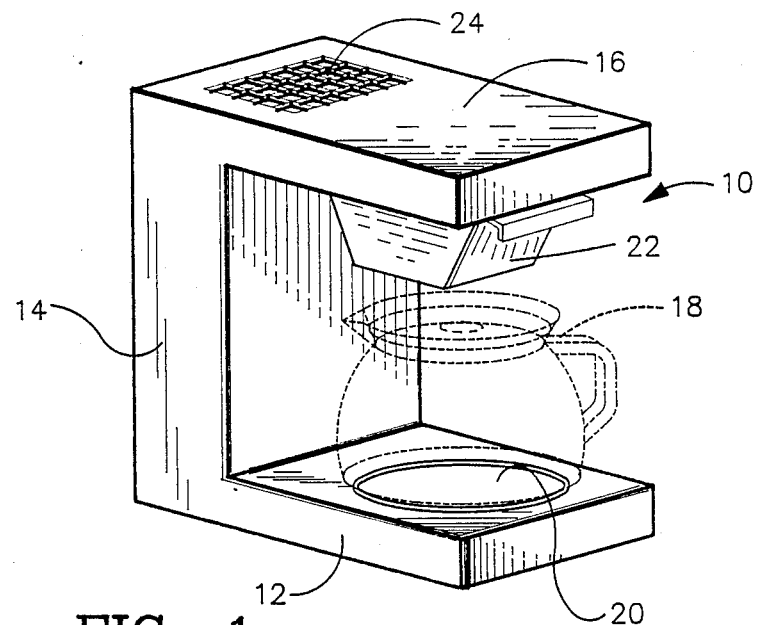
FIG. 1 is a perspective view of a coffee maker showing the basic structure with which the present invention may be used in combination and which shows a coffee pot in phantom.

As is shown in FIG. 1, then, the heating appliance in the form of an automatic drip coffee maker 10 includes a base support 12, an upright section 14 and a top section 16. Base support 12 supportively mounts a heating element 20 which in turn supports and heats a coffee pot 18, shown in phantom. Top section 16 holds a filter assembly 22 adapted to receive a coffee filter and granulated coffee beans, and a water intake port 24 is located at a rearward portion of top section 16. In use, a measured portion of water is dispensed into water intake port 24 wherein it flows into a holding chamber in upright section 14 to be heated by a brewing element separate from heating element 22. This heated water is conveyed by appropriate hot water conduits and discharged from top section 16 into filter assembly 22 after which the hot water passes through the granulated coffee thereby picking up flavor and aroma and drips out of filter assembly 22 into coffee pot 18. After this brewing process is completed, the liquid-brewed coffee may be consumed and, to this end, coffee pot 18 acts as a heating and storing vessel for the brewed coffee. Heating element 20 maintains the brewed coffee at a holding temperature for consumption.

Figure 2:
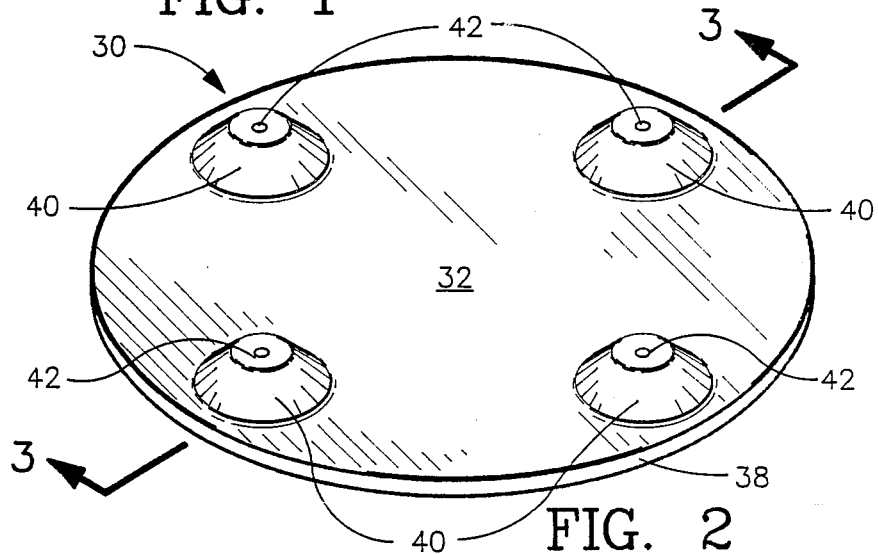
FIG. 2 is a perspective view of the preferred embodiment of the thermal interface device according to the present invention.
Figure 3:
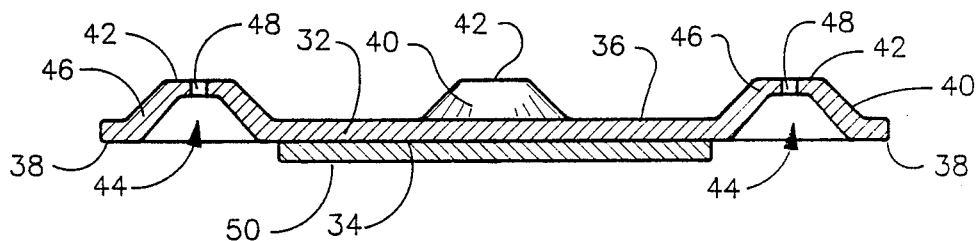
FIG. 3 is a cross sectional view taken about lines 3—3 of FIG. 2.
Figure 4:
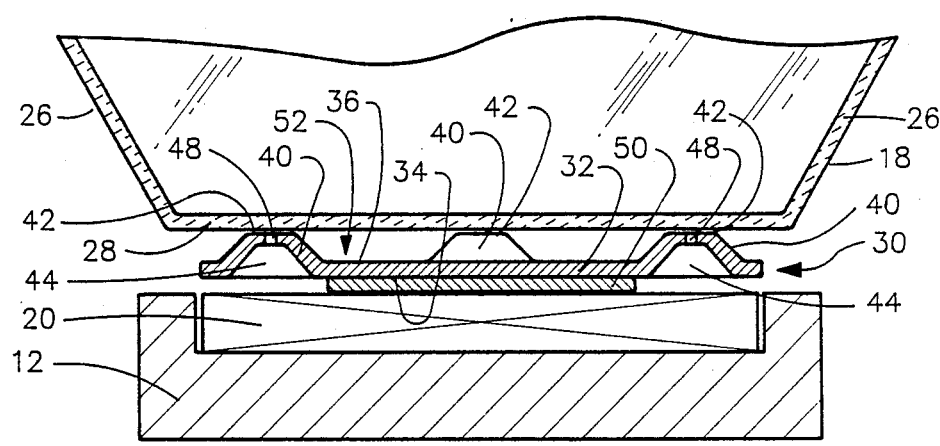
FIG. 4 is a side view partially broken away and in cross section showing the preferred embodiment of the present invention interposed between a heating element and coffee pot.

As noted above, the preferred embodiment of the present invention is directed to a thermal interface plate which is adapted to be inserted between a heating element and a vessel to be heated thereby. The preferred embodiment of this device is best shown in FIGS. 2-4 wherein thermal interface device 30 is formed as a flat plate 32 of heat conductive material which, as is shown best in FIG. 4, is dimensioned to overlay heating element 20 and be supported thereby. Preferably, heating element 30 is formed out of an integral piece of copper material although other heat conducting materials are within the scope of this invention. Flat plate 32 has a bottom surface 34 which faces heating element 20 when interface device 30 is placed thereon. An upper surface 36 is located opposite bottom surface 34 and faces coffee pot 18 when coffee pot 18 is set on interface device 30.

As is shown in FIGS. 2–4, raised surface support means are located on upper surface 36 of interface device 30 in order to support a coffee pot thereon. In the preferred embodiment shown in these figures, the raised surface support means includes a plurality of dome-shaped support structures 40 which are preferably frustoconical in shape having a flattened top face 42. In the preferred form of the present invention, four such support structures are provided and are located equiangularly around and spaced from peripheral edge 38 of flat plate 32. Furthermore, in the preferred form of the present invention, as is best shown in FIGS. 3 and 4, support structures 40 and flat plate 32 are formed as a unitary piece of thermally conductive material with dome-shaped support structures 30 being created by deformed regions of flat plate 32. This correspondingly forms a plurality of concavities 44 in bottom surface 36. Each concavity 44 and its respective support structure 40 may be formed by mechanically stamping a disc-shaped production blank so that each concavity 44 forms a hollow interior for its respective support structure 40 with support structure 40 having a thinned frustoconical side wall 46, as is best shown in Figure 3. Preferably, flat plate 32, when formed of copper, has a thickness between 0.030 and 0.100 inch, inclusive, and support structures 40 are formed so that top faces 42 are located at least 0.050" above upper surface 36 so that the heating vessel is supported in spaced relation to upper surface 36 at least 0.050". Flat plate 32 has a diameter between 3.5 and 4.5 inches, preferably 3.875 inches, depending on the size of the heating element with which it is to be used.

In the preferred form of the present invention, it is also desirable to prevent slippage of interface device 30 when it is positioned on heating element 20. To this end, it is preferred to provide a layer 50 of adhesive material covering a bottom surface portion of bottom surface 34. Since this adhesive material is to be used on the heating element, it is important that the adhesive material be able to withstand temperatures in excess of 200° F. although the ordinarily skilled artisan will realize that higher temperature resisting adhesive materials would be necessary where the heating element has a higher operating temperature than 200° F. In any event, for a given application, it is necessary that adhesive material 50 be selected to withstand temperatures in excess of the peak temperatures of the heating element upon which thermal interface device 30 will be used. In the embodiment shown in FIGS. 3 and 4, adhesive layer 50 is constructed as a double-sided glass fiber tape, and one such material found suitable for adhesive layer 50 is sold as P212 by the Permacel Tape Company of New Brunswick, N.J. USA. Other materials such as high temperature adhesive films and the like could be used for layer 50, all as is known in the art.

The use of thermal interface device 30 is best shown, then, in FIG. 4 wherein interface device 30 is placed on heating element 20 and adhered thereto by means of adhesive layer 50. Due to its intimate contact with heat element 20, and the relative thinness of layer 50, interface device 30 may be directly heated by heating element 20. As is shown in this figure, coffee pot 18 has a side wall 26 and a base 28 with base 28 adapted to engaged and be supported on top faces 42 of each of dome-shaped support structures 40. It should thus be appreciated that top faces 42 are oriented along a geometric surface complimentary to the shape of base 28. Furthermore, it should be seen in FIG. 4 that a convection space 52 is thus created between base 28 and flat plate 32 with only minimal contact between base 28 and flat faces 42. Further, since it is possible that some liquids may inadvertently enter the region between interface device 30 and heating element 20, interface device 30 preferably has a plurality of vent holes 48 formed therethrough with these vent holes 48 preferably being located centrally through top face 42 of each dome-shaped support structure 40. Vent holes 48 allow the venting of steam or other vapors from underneath interface device 30.

Those skilled in the art will realize that, with respect to automatic drip coffee makers, two types of heating elements are provided to maintain the brewed coffee at an elevated holding temperature suitable for consumption. A first type of heating element typically has an operating temperature of 220° to 250° F., inclusive, and it normally holds brewed coffee in a coffee pot at a holding temperature in excess of 170° F. A second type of heating element is a cyclical element which cycles between an "on" state having a maximum temperature in excess of 250° F. and an "off" state having a minimum temperature defined by the heat dissipation characteristics of the respective temperature element.

In each of these cases, brewed coffee being held for consumption in coffee pot 18 normally is subjected to degradation. For example, with respect to a constant temperature heating element, localized hot spots are found on such plates wherein these hot spots may have temperatures in excess of 300° F. even though the overall average temperature for the heating element is much less. That portion of the coffee pot in contact with these hot spots accordingly becomes excessively heated and causes localized burning or scorching of the brewed coffee adjacent thereto. This causes degradation of the brewed coffee over time since an increasing percentage of coffee becomes burned or scorched. Indeed, experience has shown, that in these localized regions, boiling of the brewed coffee may be observed. With respect to the cyclical heating elements, a large portion of the surface area of the heating element becomes excessively heated which causes intermittent burning or scorching of coffee with the same results in degradation to the brewed liquid.

The present invention, as noted, is directed to the elimination of these localized and excessive heating effects of both types of heating elements. This is accomplished by preventing direct contact between base 28 of coffee pot 18 and the heating element 20. Spacing base 28 from the surface of the heating element provides a convection space 52, and base 28 thus experiences reduced heating from thermal conduction. Instead, base 28 as well as the brewed coffee contained in coffee pot 18 is subjected to heating from hot air convection currents through convection space 52 as well as infrared heating at wavelengths according to the well-known Wien's Displacement Law $\lambda_m T = b$ (T expressed in degrees Kelvin; b=0.28978 cmK).

Figure 5:
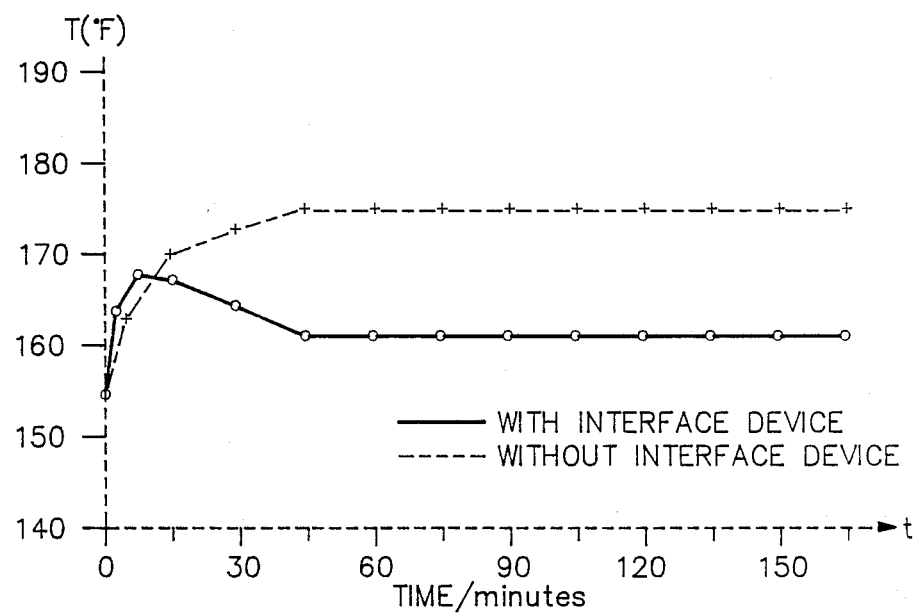
FIG. 5 is a graph of the temperature of brewed coffee versus time for a coffee maker system both with and without the addition of the preferred embodiment of the present invention.

FIG. 5 shows a graph of brewed coffee temperature as a function of time for a constant temperature heating element drip coffee maker system both for the temperature of brewed coffee held by a coffee pot directly on the heating element 20 (dashed line graph) and for the same system implementing the thermal interface device 30 as described above (solid line graph). As is shown in FIG. 5, without the invention according to the preferred embodiment of the present invention, the brewed coffee is initially received into the coffee pot 18 at a temperature of approximately 155° F. and is then elevated by holding heating element 20 to a temperature of approximately 175° F. over a course of 30 to 45 minutes. Due to localized heating as described above, however, this coffee may become degraded even though the holding temperature, at an average, does not exceed the burn or scorch temperature of coffee which is approximately 190° F. On the other hand, by inserting thermal interface device 30 onto heating element 20, the brewed coffee is elevated to a temperature of initially approximately 168° F. after which it slightly cools to approximately 162° F. in the same 30 to 45 minute period. The brewed coffee is then maintained by convection currents and infrared heating at a holding temperature less than or equal to 165° F. which has been found quite suitable for consumption. This temperature is maintained without risk of thermal hot spots leading to product degradation.

With respect to cyclical heating elements, the thermal interface device forms a thermal mass operative to dampen the cyclical effect of the heating so as to store heat generated when the cyclical heating element is in its "on" state and discharge such heat both during the "on" and "off" states as convection heat and infrared radiation to the coffee stored in coffee pot 18. With such cyclical heating, it has been found that, over the course of approximately two hours, the stored, brewed coffee gradually decreases in holding temperature from approximately 160° F. to 150° F. which has been found quite suitable for consumption, being only a few degrees less than the brewed temperature of coffee from the coffee maker. This interface device thus dampens the amplitude of the maximum temperature and avoids burning of the brewed coffee when the heating element is in the "on" state.

Figure 6:
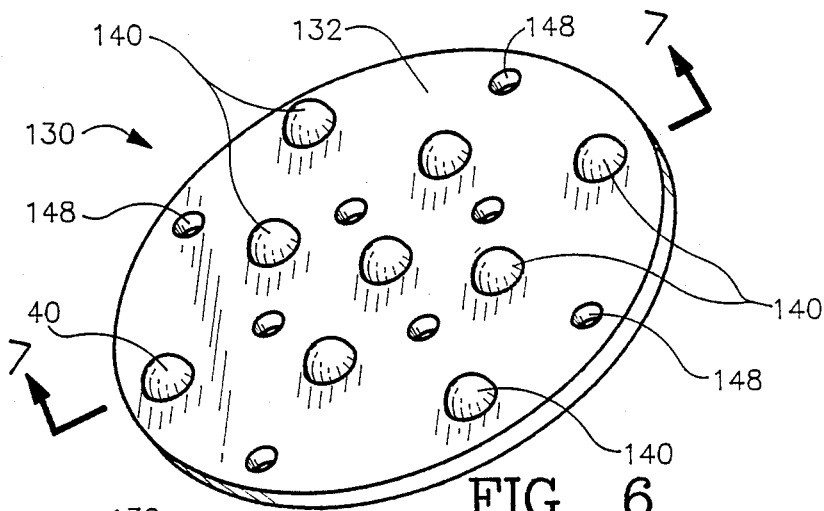
FIG. 6 is a perspective view of a first alternate embodiment of the present invention.
Figure 7:
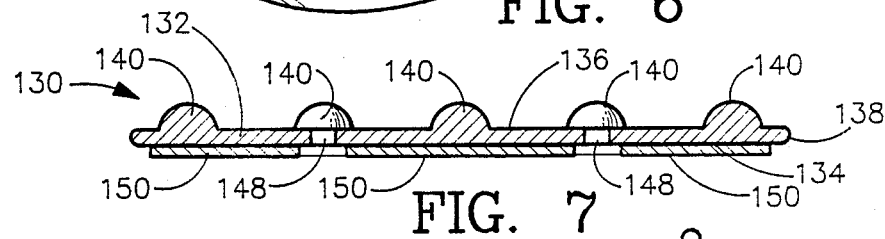
FIG. 7 is a cross sectional view taken about lines 7—7 of FIG. 6.

A first alternate embodiment of the present invention is shown in FIGS. 6 and 7 wherein a thermal interface device 130 is formed as a flat plate 132 of heat conductive material which has a bottom surface 134 and an upper surface 136. Interface device 130 again is a circular disc-shaped object having a peripheral edge 138. A plurality of dome-shaped support structures 140 are located on upper surface 136. As is shown in FIG. 5, nine such dome-shaped structures 140 are provided.

In the embodiment shown in FIGS. 6 and 7, the construction of each dome-shaped structure 140 is different in that each is constructed as a solid semi-spherical mass formed integrally with flat plate 132. In this construction, it is convenient that interface device 130 be constructed as a cast copper unit. The top portions of each support structure 140 is thus rounded instead of flattened and no concavity, corresponding to cavity 44, is provided in this embodiment. Furthermore, a plurality of vent holes 148 are provided directly through a flat plate portion of interface device 130 with these vent holes 146 not being located through respective dome-shaped structures 140. Again, an adhesive layer 150 covers portions of bottom surface 134 in order to adherably secure interface device 130 to a desired heating element 20.

Figure 8:
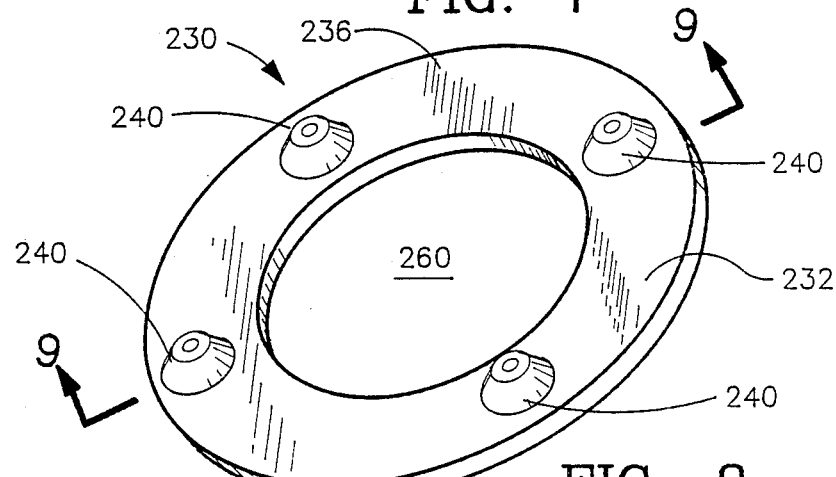
FIG. 8 is a perspective view of a second alternate embodiment of the present invention.
Figure 9:
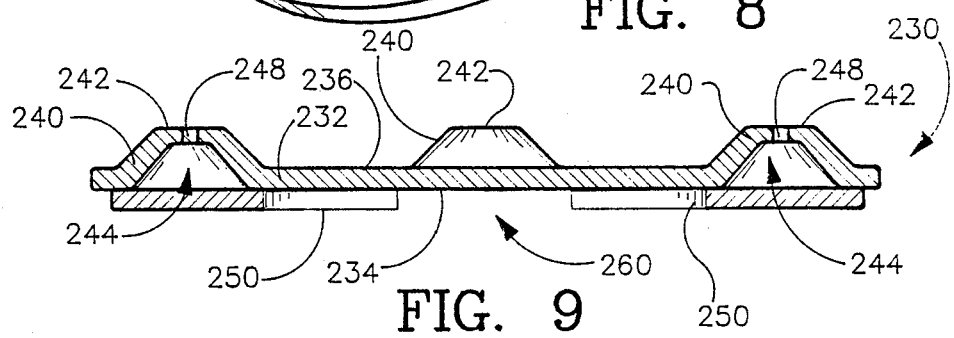
FIG. 9 is a cross sectional view taken about lines 9—9 of FIG. 8.

A second alternate embodiment of the present invention is shown in FIGS. 8 and 9 wherein thermal interface device 230 is formed substantially identically with the embodiment shown in FIG. 2 except that a large circular open region 260 is provided therein such that thermal interface device 230 is the form of an annular flat plate ring 232 of heat conductive material. A plurality of dome-shaped support structures 240 are located equi-distantly around ring 232 on top surface 236 thereof. Each of these dome-shaped structures 240 are formed the same as dome-shaped structures 40. Accordingly, each structure 240 has a flattened top face 242, a concavity 244 and a vent hole 248, as is best shown in FIG. 9. Concavities 246 are formed in bottom surfae 234 of ring 232, and arcuate adhesive layer sections 250 are located on bottom surface 234 between adjacent concavities 244.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A thermal interface device adapted to be inserted between a cyclical heating element cycling between an on state having a maximum temperature in excess of 250° and an off state having a minimum temperature and a vessel to be heated thereby to minimize degradation of a product within the vessel, comprising:

a flat plate of heat conductive material sized to overlay a heating element and be supported thereby, said flat plate having a thermal mass and a bottom surface facing said heating element and an upper surface opposite said bottom surface;

raised surface support means located on said upper surface for supporting a vessel in spaced relation to said upper surface whereby said vessel is heated primarily by convection currents and infrared radiation, said plate being operative to store heat when the heating element is in the one state and discharge heat during both on and off states thereby dampening an amplitude of maximum temperatures.

2. A thermal interface device adapted to be inserted between a heating element and a vessel to be heated thereby to provide a relatively constant temperature thermal mass, comprising:

a flat plate of heat conductive material sized to overlay a heating element and be supported thereby, said flat plate having a bottom surface facing said heating element and an upper surface opposite said bottom;

raised surface support means located on said upper surface for supporting a vessel in spaced relation to said upper surface whereby said vessel is heated primarily by convection currents and infrared radiation; and, a layer of adhesive material covering a bottom surface portion of said bottom surface and operative to adhere said interface device to said heating element, said adhesive material being able to withstand temperatures of at least 200° F.

3. A thermal interface device according to claim 2 wherein said adhesive material is formed as a double-sided tape.

4. A thermal interface device according to claim 2 wherein said adhesive material is a glass fiber material.

5. A thermal interface device according to claim 2 wherein said raised surface support means includes a plurality of dome-shaped support structures.

6. A thermal interface device according to claim 5 wherein said dome-shaped support structures are created by deformed regions of said flat plate whereby each dome-shaped support structure has a corresponding concavity in said bottom surface.

7. A thermal interface device according to claim 5 wherein said plate has a plurality of vent holes formed therethrough.

8. A thermal interface device according to claim 7 wherein each said dome-shaped structure has one of said vent holes located centrally thereof.

9. A thermal interface device according to claim 5 wherein each dome-shaped structure has a flattened top face defining a support surface for said vessels.

10. A thermal interface device according to claim 2 wherein said flat plate and said raised surface support means are formed of a unitary piece of copper material.

11. A thermal interface device according to claim 2 wherein said raised support support means supports said vessel at least 0.050 inch above said upper surface.

12. In combination with an automatic drip coffee maker having a cyclical heating element cycling between an on state having a maximum temperature and an off state having a minimum temperature and a coffee pot which receives and stores brewed coffee from the coffee maker and which has a base normally supported by said heating element such that the brewed coffee is maintained at an elevated temperature for consumption, the improvement comprising a thermal interface device constructed as a flat plate of heat conductive material having a thermal mass and being dimensioned similarly to said heating element with a flat bottom surface facing the heating element and a flat upper surface facing the base of said coffee pot, said interface device being provided with a plurality of raised support structures on its upper face, said raised support structures defining a support surface operative to support said base in spaced relation above the upper surface to establish a convection space therebetween, said plate being operative to store heat when the heating element is in the on state and discharge heat during both the on and off state thereby dampening an amplitude of maximum temperatures.

13. The improvement according to claim 12 wherein said heating element is cyclically activated by said coffee maker, so that the temperature thereof cycles between on "on" state having a maximum temperature in excess of 250° F., said interface device operative to avoid burning of the brewed coffee when the heating element is in the "on" state while maintaining the brewed coffee at a sufficiently heated temperature for consumption above the minimum temperature off the heating element.

14. In combination with an automatic drip coffee maker having a heating element and a coffee pot which receives and stores brewed coffee from the coffee maker and which has a base normally supported by said heating element such that the brewed coffee is maintained at an elevated temperature for consumption, the improvement comprising a thermal interface device constructed as a flat plate of heat conductive material dimensioned similarly to said heating element with a flat bottom surface facing the base of said coffee pot, said interface device being provided with a plurality of raised support structures on its upper face, said raised support structures defining a support surface operative to support said base in spaced relation above the upper surface to establish a convection space therebetween, and an adhesive layer formed on the bottom surface of said interface device and operative to secure said interface device to said heating element.

15. The improvement according to claim 14 wherein said raised support structures are defined by a plurality of dome-shaped portions each having a top face oriented along a geometric surface complementary to the shape of said base.

16. The improvement according to claim 15 wherein said dome-shaped portions are created by deformed regions of said flat plate whereby each dome-shaped portion has a corresponding concavity in said bottom surface.

17. The improvement according to claim 16 wherein each dome-shaped portion has a vent hole formed centrally therethrough.

18. The improvement according to claim 12 wherein said heating element has an operating temperature in a range of 220° to 250° F., inclusive, and normally holds brewed coffee in the coffeepot at a holding temperature in excess of 170° F., said interface device and raised support structures being configured such that the holding temperature is reduced to less than or equal to 165° F. and suitable for consumption.

* * * * *